United States Patent
Olson

(10) Patent No.: US 9,709,195 B2
(45) Date of Patent: Jul. 18, 2017

(54) CONDUIT FOR AN AIR INDUCTION SYSTEM INCLUDING A FLEXIBLE SEALING CUFF AND RELATED METHOD

(71) Applicant: MANN+HUMMEL GMBH, Ludwigsburg (DE)

(72) Inventor: Bradley Olson, Plainwell, MI (US)

(73) Assignee: MANN+HUMMEL GMBH, Ludwigsburg (DE)

( * ) Notice: Subject to any disclaimer, the term of this patent is extended or adjusted under 35 U.S.C. 154(b) by 471 days.

(21) Appl. No.: 14/185,380

(22) Filed: Feb. 20, 2014

(65) Prior Publication Data
US 2015/0233498 A1 Aug. 20, 2015

(51) Int. Cl.
*F16L 13/007* (2006.01)
*F16L 13/11* (2006.01)
*F16L 33/34* (2006.01)

(52) U.S. Cl.
CPC ............ *F16L 13/007* (2013.01); *F16L 13/11* (2013.01); *F16L 33/34* (2013.01); *Y10T 29/49826* (2015.01)

(58) Field of Classification Search
CPC ....... F16L 13/007; F16L 13/013; F16L 13/02; F16L 47/02; F16L 47/18; F16L 47/12; F16L 27/12; F16L 47/14; F16L 13/103; F16L 13/11; F16L 23/00; F16L 33/34; F13L 13/10
See application file for complete search history.

(56) References Cited

U.S. PATENT DOCUMENTS

| | | | | | |
|---|---|---|---|---|---|
| 1,732,721 | A | * | 10/1929 | Horine | F16L 27/1004 285/229 |
| 3,416,819 | A | * | 12/1968 | Day | F16L 27/12 285/148.19 |
| 4,283,078 | A | * | 8/1981 | Ross | F16L 27/12 285/227 |
| 4,350,372 | A | * | 9/1982 | Logsdon | F16L 27/111 285/226 |
| 5,316,350 | A | * | 5/1994 | Kollenbrandt | A61M 16/08 285/242 |
| 7,398,798 | B2 | * | 7/2008 | Ostan | F16L 11/15 138/114 |

* cited by examiner

*Primary Examiner* — Adriana Figueroa
*Assistant Examiner* — Jessie Fonseca
(74) *Attorney, Agent, or Firm* — James Hasselbeck

(57) ABSTRACT

A conduit for an air induction system includes a duct and a flexible sealing cuff. The duct includes a first duct end, is generally cylindrical, and defines a channel. The flexible sealing cuff includes a first cuff end and is generally cylindrical. The flexible sealing cuff is carried at the first duct end of the duct. A bonded joint secures the first cuff end of the flexible sealing cuff to the first duct end of the duct. The flexible sealing cuff may be at least substantially disposed within the channel such that the flexible sealing cuff shields the channel from the bonded joint.

8 Claims, 3 Drawing Sheets

CONDUIT FOR AN AIR INDUCTION SYSTEM INCLUDING A FLEXIBLE SEALING CUFF AND RELATED METHOD

FIELD

The present disclosure relates to air induction systems. More particularly, the present disclosure relates to a conduit for an air induction system including a flexible sealing cuff. The present disclosure also more particularly relates to a method of assembling a conduit of an air induction system.

BACKGROUND

This section provides background information related to the present disclosure which is not necessarily prior art.

Air induction systems are used in motor vehicles and for other applications to transport air from the environment to an engine for combustion. An air induction system conventionally includes at least one conduit that couples a filter housing to the engine and allows air to travel therebetween. It is important that air delivered to the engine is substantially free of debris. At least one end of the duct may include a cuff that is formed from a different material than the duct. The cuff may be inserted into the duct to provide an improved connection between the duct and the engine or between the duct and the filter housing, for example. In certain applications, the flexible sealing cuff may be welded to the duct.

While known conduits for air induction systems may have proven to be acceptable for their intended uses, continuous improvement in the pertinent art is desired.

SUMMARY

This section provides a general summary of the disclosure, and is not a comprehensive disclosure of its full scope or all of its features.

According to one particular aspect, the present disclosure provides a conduit for an air induction system. The conduit includes a duct and a flexible sealing cuff. The duct is generally cylindrical, defines a channel and includes a first duct end. The flexible sealing cuff is generally cylindrical and includes a first cuff end. The flexible sealing cuff is carried at the first duct end of the duct. A bonded joint secures the first cuff end of the flexible sealing cuff to the first duct end of the duct. The flexible sealing cuff may be at least substantially disposed within the channel such that the flexible sealing cuff shields the channel from the bonded joint.

According to another particular aspect, the present disclosure provides a conduit for an air induction system. The conduit includes a duct and a flexible sealing cuff. The duct defines a channel and includes a first duct end with a radially extending portion. The flexible sealing cuff is generally cylindrical and includes a first cuff end secured to the first duct end at a joint. The flexible sealing cuff is articulable from a first position in which the flexible sealing cuff is at least substantially disposed outside the channel to a second position in which the sealing cuff is at least substantially disposed within the channel, substantially sealing the joint from the channel.

According to a further particular aspect, the present disclosure provides a method of assembling a conduit for an air induction system of an engine. The method includes providing a duct defining a channel. The method also includes providing a generally cylindrical and flexible sealing cuff. The method further includes securing a first cuff end of the flexible sealing cuff to a first duct end of the duct at a joint while the flexible sealing cuff is at least substantially disposed outside the channel. The method additionally includes articulating the flexible sealing cuff such that the flexible sealing cuff is at least substantially disposed in the channel and shields the joint from the channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
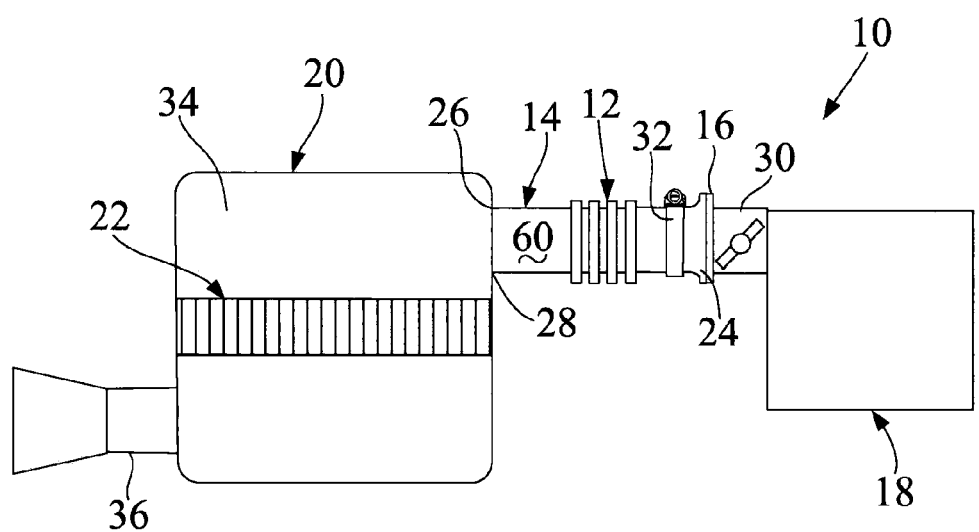
FIG. 1 is a simplified schematic view of an air induction system including a conduit having a flexible sealing cuff in accordance with the teachings of the present disclosure.

With initial reference to FIG. 1 of the drawings, an air induction system constructed in accordance with the present teachings is illustrated and generally identified at reference numeral 10. The present disclosure is particularly directed to a conduit 12 of the air induction system 10. The conduit 12 may be constructed to include a duct 14 and a flexible sealing cuff 16. It will be understood that the remainder of the air induction system is conventional in both construction and operation to the extent not otherwise described herein. The air induction system 10 may be used to transport and filter air from and between the environment and a combustion engine 18 or other device utilizing a flow of air. While not limited thereto, the air induction system 10 may be used in a motor vehicle, for example.

The air induction system 10 is illustrated to conventionally include a housing 20 and a filter 22 disposed in the housing 20. The duct 14 may extend between a first end 24 and a second end 28. The first end 24 of the duct 14 may be secured to an inlet 30 for the engine 18 with a clamp 32. The second end 28 of the duct 14 may be secured to or integrally formed with the housing 20 at an outlet 26 thereof. Air from the environment may generally travel through the air induction system 10 to the engine 18 by passing through the housing 20, the filter 22, and the conduit 12. The engine 18 may be an internal combustion engine for a motor vehicle (not shown). The housing 20 may define a chamber 34 and may include an inlet 36 in fluid communication with the environment (e.g., source of intake air). Insofar as the present teachings are concerned, the filter 22 may be disposed between the inlet 36 and the outlet 26. The filter 22 may be conventional in both construction and operation and may function to filter or clean the air as it travels through the housing 20 from the environment to the engine 18.

Figure 2:
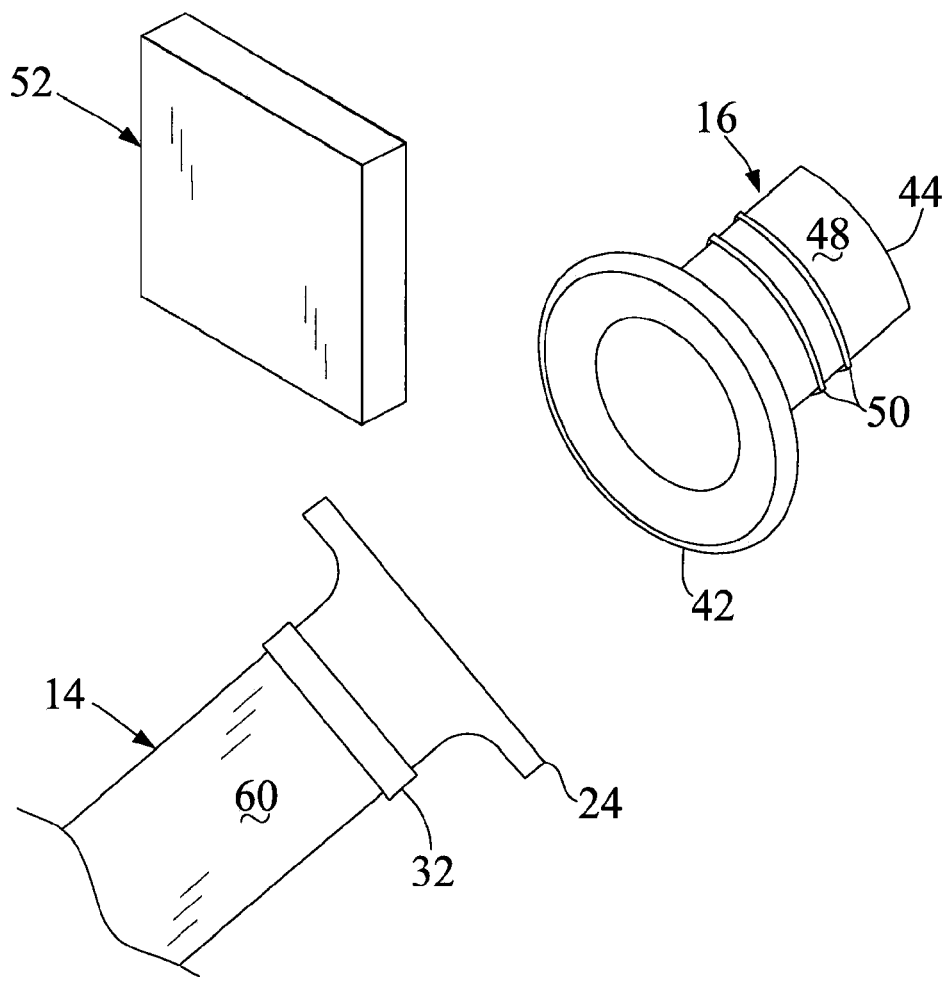
FIG. 2 is a perspective view of the conduit of the air induction system of FIG. 1, a duct and a flexible sealing cuff of the conduit shown in a pre-assembled configuration.
Figure 3:
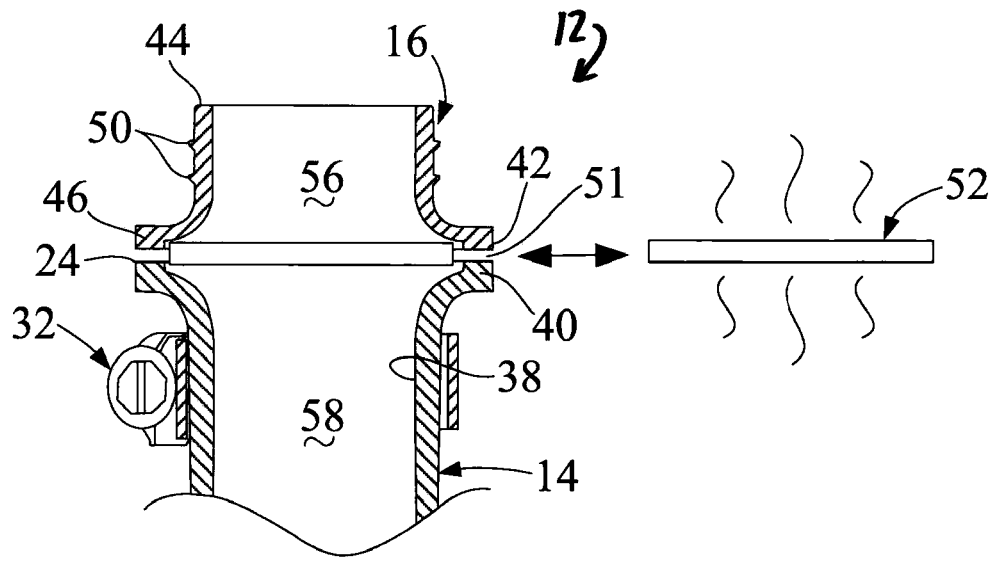
FIG. 3 is a cross-sectional view of the conduit of FIG. 2, the duct and the flexible sealing cuff shown in the pre-assembled configuration and shown operatively associated with a heating device.
Figure 4:
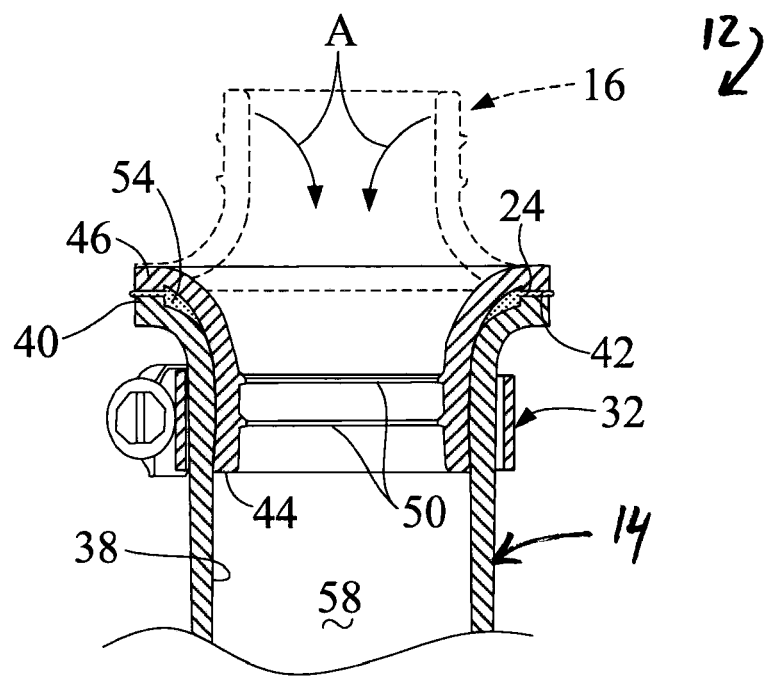
FIG. 4 is a cross-sectional view similar to FIG. 3, illustrating the conduit after the flexible sealing duct is articulated to an assembled configuration.

With continued reference to FIG. 1 and additional reference to FIGS. 2 through 4, the conduit 12 of the air induction system 10 will be further described. The duct 14 of the conduit 12 may define a channel 38 and may be substantially cylindrical in shape. The duct 14 may be constructed from a generally rigid material such as a plastic material. In one application, the duct 14 may be constructed from polypropylene. It will be appreciated, however, that the duct 14 may be constructed from other materials within the scope of the present teachings. It will be understood that the material of the duct 14 is more rigid than the material of the flexible sealing cuff 16. As illustrated, the first end 24 of the duct 14 may be substantially flared or bell-shaped. In this regard, the first end 24 of the duct 14 may include a radially extending portion 40.

The flexible sealing cuff 16 may be a generally cylindrical member constructed from a generally flexible or pliable material. For example, the flexible sealing cuff 16 may be constructed of a natural or synthetic rubber material. In one particular application, the flexible sealing cuff 16 may be constructed from a blend of polypropylene and ethylene propylene diene monomer rubber. It will be appreciated, however, that the flexible sealing cuff 16 may be constructed from other generally flexible materials within the scope of the present teachings. The flexible sealing cuff 16 extends between a first end 42 and a second end 44.

The first end 42 of the flexible sealing cuff 16 may be substantially flared or bell-shaped, including an annular flange portion 46 extending radially from the remainder of the flexible sealing cuff 16. A diameter and radially extending surface area of the annular flange portion 46 may be substantially equal to a diameter and radially extending surface area of the radially extending portion 40 of the duct 14.

As illustrated particularly in FIGS. 2 and 4, an outer surface 48 of the flexible sealing cuff 16 may define one or more annular flange portions 50 extending radially therefrom. As illustrated, in one configuration the outer surface 48 may include two annular flange portions 50. However, it will be appreciated that the outer surface 48 alternatively may include more or less than two annular flange portions 50 within the scope of the present teachings. As will be described in more detail herein, the flange portions 50 may help to ensure a seal between the flexible sealing cuff 16 and another portion of the air induction system 10 including, by way of example only, the inlet 30 of the engine 18.

With continued reference to FIGS. 2 through 4, a method of assembling the duct 14 and the flexible sealing cuff 16 will be described. As illustrated in FIGS. 2 and 3, the duct 14 may be initially positioned relative to the flexible sealing cuff 16 such that the first end 24 of the duct 14 is aligned with the first end 42 of the flexible sealing cuff 16. The first end 42 of the flexible sealing cuff 16 and the first end 24 of the duct 14 may define a gap 51 therebetween prior to securement.

A heating device 52 such as a hot plate may be laterally inserted into the gap 51 between the first end 42 of the flexible sealing cuff 16 and the first end 24 of the duct 14. The heating device 52 may be positioned in the gap 51 for a predetermined amount of time sufficient to soften or at least partially melt a portion of at least one of the annular flange portion 46 of the flexible sealing cuff 16 and the radially extending portion 40 of the duct 14. Upon removal of the heating device 52 from the gap 51, the first end 42 of the flexible sealing cuff 16 may be positioned adjacent to and in contact with the first end 24 of the duct 14 such that the annular flange portion 46 of the flexible sealing cuff 16 is aligned with the radially extending portion 40 of the duct 14. The softened or melted portion of the annular flange portion 46 and/or the radially extending portion 40 may adhere to the other of the radially extending portion 40 and annular flange portion 46, creating a bonded joint 54 therebetween, such that the first end 42 and the flexible sealing cuff 16 is coupled to the first end 24 of the duct 14. Accordingly, the joint 54 may be a welded joint.

While the process of coupling the first end 42 of the flexible sealing cuff 16 to the first end 24 of the duct 14 is described herein as using a hot plate 52 to create a welded joint 54 therebetween, it will also be appreciated that other methods may be used to couple the first end 42 of the flexible sealing cuff 16 to the first end 24 of the duct 14 within the scope of the present teachings. For example, in one method of assembling the duct 14 and the flexible sealing cuff 16, a spin welding technique may be used whereby the first end 24 of the duct 14 is placed adjacent the first end 42 of the flexible sealing cuff 16 and the duct 14 is rotated relative to the flexible sealing cuff 16. Friction between the duct 14 and the flexible sealing cuff 16 may generate heat that softens or melts at least one of the annular flange portion 46 of the flexible sealing cuff 16 and the radially extending portion 40 of the duct 14. The duct 14 and the flexible sealing cuff 16 may then be assembled in the manner described above. In another method of assembling the duct 14 and the flexible sealing cuff 16, the first end 42 of the flexible sealing cuff 16 may be coupled to the first end 24 of the duct 14 by placing an adhesive on at least one of the first end 42 and the first end 24 prior to positioning the first end 42 adjacent to and in contact with the first end 24, as previously described. Accordingly, the joint 54 may be an adhesive joint within the scope of the present teachings.

Upon attachment of the flexible sealing cuff 16 to the duct 14 in the manner discussed above, the flexible sealing cuff 16 is oriented in a first position (FIG. 3). In this first position, the flexible sealing cuff 16 is substantially positioned outside the channel 38 of the duct 14.

In another step of the method of assembling the duct 14 and the flexible sealing cuff 16, the flexible sealing cuff 16 may be articulated to a second position. The second position of the sealing cuff is shown in FIG. 4 in solid lines. In the second position, the flexible sealing cuff 16 is at least substantially disposed within the channel 38 of the duct 14 and the flexible sealing cuff 16 shields the joint 54 from the channel 38. As air travels through the air induction system 10, including the channel 38, to the engine 18, the air does not contact the joint 54. In this manner, the flexible sealing cuff 16 ensures that contaminants in the joint 54 do not enter the engine 18 from the channel 38.

From the first position to the second position, the flexible sealing cuff 16 may be urged in the direction of arrows A (see FIG. 4). The second end 44 of the flexible sealing cuff 16 may be urged or otherwise extended longitudinally into the channel 38 of the duct 14 such that a previously inner surface 56 of the flexible sealing cuff 16 is now adjacent to an inner surface 58 of the duct 14. In this manner, the flexible sealing cuff 16 is folded inward on itself in the longitudinal direction. As particularly illustrated in FIG. 4, in an assembled configuration, the outer surface 48 of the flexible sealing cuff 16 defines a portion of an internal cavity or chamber of the air induction system 10. In this manner, the joint 54 is located between the inner surface 56 of the flexible sealing cuff 16 and the inner surface 58 of the duct 14. It will be appreciated that locating the joint 54 external to the channel 38 helps to ensure that air flowing through the channel 38 does not contact the joint 54, thus ensuring that contaminants in the joint 54 (e.g., weld contaminants, adhesive contaminants, etc.) do not enter the channel 38 or the engine 18.

In a further step of the method of assembling the duct 14 and the flexible sealing cuff 16, the clamp 32 may be placed adjacent to an outer surface 60 of the duct 14 (FIG. 2), such that the clamp 32 circumferentially surrounds the duct 14. The clamp 32 may be longitudinally aligned with the flange portions 50 of the flexible sealing cuff 16. In this way, the clamp 32 and the flange portions 50 may help to ensure a seal between the flexible sealing cuff 16 and another portion of the air induction system 10 such as an intake of the engine 18.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A conduit for an air induction system, the conduit comprising:
    a duct defining a radial interior surface defining a channel therein, the duct including
        a radially outwardly extending first annular flange formed on a first end of the duct, the first annular flange having an annular bonding face and an opening communicating with the channel;
    a flexible tubular sealing cuff, the sealing cuff including
        a radially outwardly extending second annular flange formed on a first cuff end of the flexible tubular sealing cuff, the second annular flange having an annular bonding face and an opening;
    wherein the annular bonding face of the first annular flange of the duct is sized and configured to directly mate against the annular bonding face of the second annular flange of the tubular sealing cuff;
    wherein the annular bonding face of the first annular flange is mated against, directly bonded onto and circumferentially closed against the annular bonding face of the second annular flange;
    wherein the flexible tubular sealing cuff is made of a generally flexible and pliable material, the flexible tubular sealing cuff having:
        a first position where the flexible tubular sealing cuff is arranged outwardly from the first annular flange and duct; and
        a second position wherein the flexible tubular sealing cuff is articulated through the opening of the first annular flange into the channel and is abutting against the radial interior surface of the duct, such that the flexible tubular sealing cuff is substantially disposed within channel on the radial interior surface of the duct;

wherein the flexible tubular sealing cuff, when in the second position, has at least one circumferentially closed annular rib formed on an radial inner surface of the flexible tubular sealing cuff, the at least one circumferentially closed annular rib forming a seal between the channel of the duct and another component of the air induction system received against the radial inner surface of the flexible tubular sealing cuff within the duct.

2. The conduit for an air induction system of claim 1, wherein
the duct is constructed of a relatively rigid material as compared to the flexible sealing cuff.

3. The conduit for an air induction system of claim 1, wherein
the duct is constructed of a first material and the flexible sealing cuff is constructed of a second material, the first material being more rigid than the second material.

4. The conduit for an air induction system of claim 1, wherein
the duct is constructed of polypropylene.

5. The conduit for an air induction system of claim 1, wherein
both the flexible sealing cuff and the first duct end are generally bell-shaped when the flexible sealing cuff is in the second position.

6. The conduit for an air induction system of claim 1, in combination with the air induction system.

7. The conduit for an air induction system of claim 6, further comprising
a clamp circumferentially surrounding the duct and the flexible sealing cuff.

8. The conduit for an air induction system of claim 1, wherein
the generally flexible and pliable material of the flexible tubular sealing cuff is selected from the group consisting of: a natural rubber, a synthetic rubber, or a blend of polypropylene and ethylene propylene rubber.

* * * * *